United States Patent [19]

Butti

[11] 4,115,194

[45] Sep. 19, 1978

[54] REACTOR PRESSURE VESSEL SUPPORT

[75] Inventor: James Paul Butti, Wadsworth, Ohio

[73] Assignee: The Babcock & Wilcox Company, New York, N.Y.

[21] Appl. No.: 770,965

[22] Filed: Feb. 22, 1977

[51] Int. Cl.² .................................. G21C 13/00
[52] U.S. Cl. ............................. 176/87; 176/38
[58] Field of Search ................................. 176/38, 87

[56] References Cited

U.S. PATENT DOCUMENTS

| 3,115,450 | 12/1963 | Schanz | 176/38 X |
| 3,129,836 | 4/1964 | Frevel | 176/87 |
| 3,607,630 | 9/1971 | West et al. | 176/87 X |
| 3,771,499 | 11/1973 | Marroni, Jr. | 176/87 X |
| 4,008,757 | 2/1977 | Weatherford, Jr. | 176/87 X |

FOREIGN PATENT DOCUMENTS

| 2,178,291 | 3/1972 | France | 176/87 |
| 44-26,040 | 6/1965 | Japan | 176/87 |
| 881,790 | 11/1961 | United Kingdom | 176/87 |

Primary Examiner—Peter A. Nelson
Attorney, Agent, or Firm—Joseph M. Maguire; Angelo Notaro

[57] ABSTRACT

A link and pin support system provides the primary vertical and lateral support for a nuclear reactor pressure vessel without restricting thermally induced radial and vertical expansion and contraction.

3 Claims, 2 Drawing Figures

REACTOR PRESSURE VESSEL SUPPORT

This invention was made in the course of work under Contract No. 4-37067 between the Babcock and Wilcox Co. and the U.S. Department of Commerce. The Government is licensed under and, on the occurence of a condition precedent set out in the contract, shall acquire title to this application and any resulting patent.

BACKGROUND OF THE INVENTION

1. Field of the Invention

This invention relates to nuclear reactor pressure vessel supports and, more particularly, to a link and pin support system that provides primary vertical and lateral support without restricting thermally induced radial expansion and contraction of the vessel.

2. Summary of the Prior Art

Nuclear reactor pressure vessels must be supported by structures that can adequately restrain vessel movement and accommodate the static, dynamic, and thermal loads which occur during normal operating conditions, in addition to the most adverse combination of loadings which may be experienced during postulated accidents and seismic events.

Design of the support structure will naturally be interrelated with various aspects of the reactor including its size and application, e.g., ship propulsion or electric power generation.

A number of support systems have been used in the prior art.

Primary vertical support has often been achieved by the utilization of cylindrical or frustoconical support skirts attached or integrally formed at the bottom of the reactor vessel. The skirt construction also permits radial growth of the vessel due to temperature and pressure through bending of the skirt in the manner of a vertical beam on a foundation. The skirt's length is chosen so as to permit this bending to take place safely. When space does not allow sufficient skirt flexing length, a construction consisting of a partially longitudinally slotted skirt can be used. The slotted portion acts as a multitude of cantilevers, while the unslotted portion, under the imposition of the moments and forces transmitted by the cantilevered portion, behaves as a cylinder. The support skirts rest upon soleplates, pedestals or the like.

Radially extending brackets circumferentially spaced about the reactor vessel or rings attached to its external surface which bear upon the horizontal surfaces of an enclosing reactor containment structure have also been used to achieve primary vertical support. The radial brackets and rings additionally have accommodated radial thermal growth displacements by the provision of means enabling siding contact to exist between the vessel and the containment. The reactor vessel support flange has similarly been used as a support means which bears upon portions of the containment structure.

Reactor vessels have been designed, moreover, which utilize the main coolant flow nozzles to perform the support function. In these cases, the nozzles may be arranged to transmit loads to the walls of a surrounding containment well. Typically, pads formed at the underside of the nozzles bear upon and are supported by wear plates that are disposed on the containment well walls. Guide channels and lubricants may be employed to facilitate radial movement. Where the containment well walls are concrete structures, cooling means may be required between the wear plates and walls to assure that the walls are not subjected to the high temperature of the coolant flowing through the nozzles. Alternately, vertical columns have been connected between the nozzles and a support base within the containment structure. In this arrangement, the columns are designed to accommodate relative displacements between the vessel and containment structure by flexing, thereby eliminating the need for relative sliding movements and allowing the columns to be securely fixed to the reactor vessel.

Support of reactor vessels at the nozzles requires that the nozzle structure have sufficient strength to accommodate the primary loads. Since nozzle sizing is generally dependent upon process conditions and the reactor's power rating, use of the nozzles for primary support necessitates additional nozzle reinforcement, strengthening and the like, not otherwise required. Strengthening of the nozzles to the extent necessary to carry design loads can be prohibitively expensive or otherwise impractical, particularly in reactor applications such as for marine propulsion.

The use of support brackets, moreover, are not generally considered on shipboard where high horizontal and vertical loadings, as well as roll and pitch, are involved.

A support structure which does not require strengthening of the nozzles or support brackets and allows unrestricted radial thermal growth without the need for sliding, lubricated guide channels and cooled support structures is desirable.

SUMMARY OF THE INVENTION

According to the present invention, an improved arrangement for supporting a reactor vessel is presented. Link and pin supports restrain vertical, lateral and rotational movement of the reactor vessel without restricting thermal radial expansion and contraction. The support arrangement allows vertical thermal expansion at the lower end of the reactor.

The arrangement comprises a plurality of links and pins interconnected with lugs that are attached to the reactor vessel and with an exterior support. The primary vertical loads are carried by the links and pins. The links carry the lateral component of the various lateral loads in a direction parallel to the axes of the pins associated with the links.

In alternate embodiments, a pin and socket arrangement supplements the link and pin supports by assisting in the maintenance of vertical alignment of the vessel and providing additional lateral support.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENT

Figure 1:
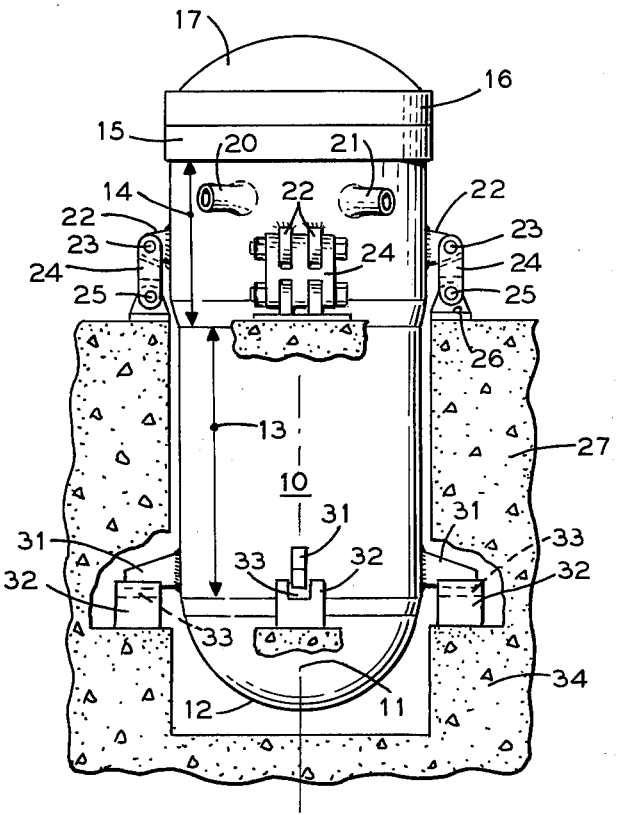
FIG. 1 is an elevational view of a typical reactor pressure vessel supported in accordance with the invention.

Referring now to the drawings, there is shown in FIG. 1 a nuclear reactor pressure vessel 10 disposed with its longitudinal axis 11 in a vertical plane. The pressure vessel 10 comprises a generally cylindrical shell 13 closed at its lower end, in the illustrated embodiment, by an integrally formed spherically-dished end closure 12. The upper end of the cylindrical shell 13 is joined to a thicker cylindrical shell ring 14. The shell ring 14 is provided with a main vessel flange 15 generally at its upper extremity. A removable closure head 17 is provided at the upper end of the pressure vessel 10. The closure head 17 is a spherical-dished head welded to a ring flange 16. The ring flange 16 of the flanged closure head 17 mates with the main vessel flange 15 and is secured thereto in a pressure tight relation by a plurality of studs (not shown).

Reactor coolant nozzles 20, 21, only two of which are shown for increased clarity, are formed in the shell ring 14 to provide fluid communication between the interior of the reactor and a reactor coolant system (not shown). The cylindrical shell ring 14 is generally formed thicker than the cylindrical shell 13 to provide inherent compensation for the nozzle apertures.

Radially projecting lugs 22 welded to the shell ring 14 are circumferentially spaced about the shell ring. Pin connectors 23 attach the lugs 22 to links 24. At room temperature, the links 24 extend generally parallel to the longitudinal axis of pressure vessel. The opposite ends of the links 24 are secured by similar pins 25 to a baseplate 26. The baseplate 26 is securely attached to a foundation 27 by bolts and nuts, welding or other means.

A plurality of radial brackets are welded to the cylindrical shell 13 at circumferentially spaced intervals, in an alternate embodiment of the invention. Each bracket 31 longitudinally and radially extends into a channel 32 that is supported by a foundation 34. A longitudinal clearance 33 exists between the bottom of bracket 31 and the opposing face of the channel 32.

The expression "lateral loads" as used herein, unless otherwise qualified, shall denote loads transmitted perpendicularly to the longitudinal axis 11 of the pressure vessel 10. Vertical loads are those loads transmitted in parallel with the longitudinal axis 11.

Thermal expansion and contraction of the pressure vessel will occur due to temperature changes resulting from changes in the reactor's operating conditions. Radial movements due to thermal expansion and contraction are accommodated by the pivoting action of the links 24 about the pins 25. Vertical movement due to thermal changes is unhindered at the lower end of the vessel. The vessel is free to expand and contract, radially and longitudinally, in the region of the radial brackets 31 due to the channel 32 and the clearance 33.

Figure 2:
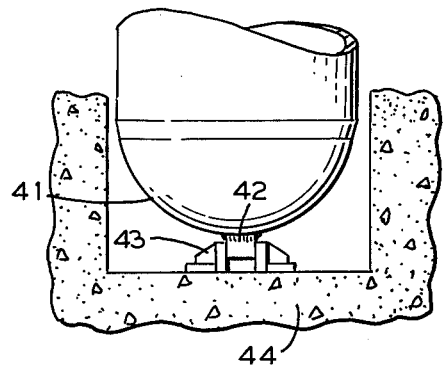
FIG. 2 is a partial elevational view of the lower portion of a pressure vessel and depicts an alternate arrangement of a feature which supplements the invention.

Alternatively, as is shown in FIG. 2, a longitudinally extending boss 42 is integrally attached at the lower end of a spherically-dished bottom end closure 41. The boss 42 extends into a socket 43 that is attached to a foundation 44.

Primary vertical support of the vessel is afforded by the links and pins. Vertical loads due to restrained translatory motion of the vessel are transmitted through the lugs, the links and the pins. Lateral loads due to restrained translatory motion of the vessel are transmitted through the lugs and links in directions parallel to the pin at each support.

The hinged pin and link support can be supplemented by radial bracket and channel, or boss and socket arrangements that provide additional lateral support at the cylindrical shell 13. These arrangements assure that the axial alignment of the vessel is maintained.

I claim:

1. The combination comprising a generally cylindrical nuclear reactor pressure vessel having a longitudinal axis, a plurality of radially projecting lugs attached to and spaced circumferentially about said pressure vessel, a support foundation, a plurality of base plates attached to said foundation, and a plurality of links disposed parallel to the longitudinal axis and a plurality of pins disposed laterally to the longitudinal axis, said links and pins being arranged at circumferentially spaced intervals so that one of said pins pivotably connects one end of a link to one of said lugs and another of said pins pivotably connects said link at its other end to a base plate forming link and pin supporting arrangements at circumferentially spaced intervals such that the pressure vessel is longitudinally supported and restrained from longitudinal, lateral and rotary movement by said link and pin supporting arrangements.

2. The combination of claim 1 further comprising a plurality of radially extending brackets attached to and spaced circumferentially about said pressure vessel, a plurality of channels, each of said brackets being disposed to longitudinally and radially extend in spaced relationship into a channel to permit longitudinal expansion and contraction of said pressure vessel while maintaining the axial alignment of said pressure vessel and providing additional lateral support.

3. The combination of claim 1 further comprising a longitudinally extending boss attached to the bottom of said pressure vessel, a socket attached to the foundation, said boss extending in part into said socket which is orientated generally concentrically thereabout to permit vertical expansion and contraction of said pressure vessel while maintaining longitudinal alignment and providing additional lateral support.

* * * * *